United States Patent

Doctor

[11] Patent Number: 5,250,482
[45] Date of Patent: Oct. 5, 1993

[54] PROCESS FRO MAGNETIC BENEFICIATING PETROLEUM CRACKING CATALYST

[75] Inventor: Richard D. Doctor, Lisle, Ill.

[73] Assignee: University of Chicago, Chicago, Ill.

[21] Appl. No.: 933,497

[22] Filed: Aug. 20, 1992

[51] Int. Cl.⁵ .................... B01J 29/38; B01J 37/34; C01G 11/05; B03C 1/36
[52] U.S. Cl. .................... 502/5; 208/52 CT; 208/120; 209/224; 209/232; 502/21; 502/516; 502/521
[58] Field of Search .................... 502/5, 21, 516; 208/52 CT, 120, 113

[56] References Cited

U.S. PATENT DOCUMENTS

| | | | |
|---|---|---|---|
| 4,406,773 | 9/1983 | Hettinger, Jr. et al. | 208/120 |
| 4,702,825 | 10/1987 | Selvaggi et al. | 505/885 |
| 4,778,594 | 10/1988 | Doctor | 209/224 |
| 5,141,904 | 8/1992 | Kubicek et al. | 502/516 |
| 5,147,527 | 9/1992 | Hettinger | 502/5 |
| 5,151,391 | 9/1992 | Fu et al. | 502/516 |

OTHER PUBLICATIONS

Modern Petroleum Technology, 4th edition, Hobson & Pohl, pp. 288-309-(1975).

*Primary Examiner*—Paul E. Konopka
*Attorney, Agent, or Firm*—Emrich & Dithmar

[57] ABSTRACT

A process for beneficiating a particulate zeolite petroleum cracking catalyst having metal values in excess of 1000 ppm nickel equivalents. The particulate catalyst is passed through a magnetic field in the range of from about 2 Tesla to about 5 Tesla generated by a superconducting quadrupole open-gradient magnetic system for a time sufficient to effect separation of said catalyst into a plurality of zones having different nickel equivalent concentrations. A first zone has nickel equivalents of about 6,000 ppm and greater, a second zone has nickel equivalents in the range of from about 2000 ppm to about 6000 ppm, and a third zone has nickel equivalents of about 2000 ppm and less. The zones of catalyst are separated and the second zone material is recycled to a fluidized bed of zeolite petroleum cracking catalyst. The low nickel equivalent zone is treated while the high nickel equivalent zone is discarded.

10 Claims, 1 Drawing Sheet

PROCESS FRO MAGNETIC BENEFICIATING PETROLEUM CRACKING CATALYST

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This invention relates to a method of beneficiating catalyst used in fluid catalytic cracking operations at petroleum refineries used to convert heavy hydrocarbon oils into lighter fractions and especially into fractions containing high concentrations of gasoline and other liquid hydrocarbon fuels.

In general, gasoline and other liquid hydrocarbon fuels boil in the range of about 100° to about 650° F. However, the crude oil from which these fuels are made contains a diverse mixture of hydrocarbons and other compounds which vary widely in molecular weight and therefore boil over a wide range. For example, crude oils are known in which 30 to 60% or more of the total volume of oil is composed of compounds boiling at temperatures about 650° F. Among these are crudes in which about 10% to about 30% or more of the total volume consists of compounds so heavy in molecular weight that they boil above 1025° F. or at least will not boil below 1025° F. at atmospheric pressure.

Because these relatively abundant high boiling components of crude oil are unsuitable for inclusion in gasoline and other liquid hydrocarbon fuels, the petroleum refining industry has developed processes for cracking or breaking the molecules of the high molecular weight, high boiling compounds into smaller molecules which do boil over an appropriate boiling range. The cracking process which is most widely used for this purpose is known as fluid catalytic cracking (FCC). Although the FCC process has reached a highly advanced state, and many modified forms and variations have been developed, their unifying factor is that a vaporized hydrocarbon feedstock is caused to crack at an elevated temperature in contact with a cracking catalyst that is suspended in the feedstock vapors. Upon attainment of the desired degree of molecular weight and boiling point reduction, the catalyst is separated from the desired products.

Crude oil in the natural state contains a variety of materials which tend to have quite troublesome effects on FCC processes, and only a portion of these troublesome materials can be economically removed from the crude oil. Among these troublesome materials are coke precursors (such as asphaltenes, polynuclear aromatics, etc.), heavy metals (such as nickel, vanadium, iron, copper, etc.), alkali metals (such as sodium, potassium, etc.), sulfur, nitrogen and others. Certain of these, such as the alkali metals, can be economically removed by desalting operations, which are part of the normal procedure for pretreatinq crude oil for fluid catalytic cracking. Other materials, such as coke precursors, asphaltenes and the like, tend to break down into coke during the cracking operation, which deposits coke on the catalyst, impairing contact between the hydrocarbon feedstock and the catalyst, and generally reducing its potency or activity level. The heavy metals transfer almost quantitatively from the feedstock to the catalyst surface.

As the catalyst is reused again and again for processing additional feedstock, which is usually the case, the heavy metals can accumulate on the catalyst to the point that they unfavorably alter the composition of the catalyst and/or the nature of its effect upon the feedstock. For example, vanadium tends to form fluxes with certain components of commonly used FCC catalysts, lowering the melting point of portions of the catalyst particles sufficiently so that they begin to sinter at cracking temperatures and become ineffective cracking catalyst. Accumulations of vanadium and other heavy metals, especially nickel, also "poison" the catalyst. They tend in varying degrees to promote excessive dehydrogenation and aromatic condensation, resulting in excessive production of carbon and gases with consequent impairment of liquid fuel yield. An oil such as a crude or crude fraction or other oil that is particularly abundant in nickel and/or other metals exhibiting similar behavior, while containing relatively large quantities of coke precursors, is referred to herein as a carbo-metallic oil, and represents a particular challenge to the petroleum refiner.

Since the various heavy metals are not of equal catalyst poisoning activity, it is convenient to express the poisoning activity of an oil containing a given poisoning metal or metals in terms of the amount of a single metal which is estimated to have equivalent poisoning activity. Thus, the heavy metals content of an oil can be expressed by the following formula (patterned after that of W. L. Nelson in *Oil and Gas Journal*, page 143, Oct. 23, 1961) in which the content of each metal present is expressed in parts per million of such metal, as metal, on a weight basis, based on the weight of feed:

$$\text{Nickel Equivalents} = \text{Ni} + \frac{V}{4.8} + \frac{Fe}{7.1} + \frac{Cu}{1.23}$$

According to conventional FCC practice, the heavy metal content of feedstock for FCC processing is controlled at a relatively low level, e.g., about 0.25 ppm Nickel Equivalents or less. The present invention is concerned with the processing of feedstocks containing metals substantially in excess of this value and which therefore have a significantly greater potential for accumulating on and poisoning catalyst.

The above formula can also be employed as a measure of the accumulation of heavy metals on cracking catalyst, except that the quantity of metal employed in the formula is based on the weight of catalyst (moisture free basis) instead of the weight of feed. In conventional FCC practice, in which a circulating inventory of catalyst is used again and again in the processing of fresh feed, with periodic or continuing minor addition and withdrawal of fresh and spent catalyst, the metal content of the catalyst is maintained at a level which may for example be in the range of about 2000 to about 6000 ppm Nickel Equivalents. The process of the present invention is concerned with the use of catalyst having a substantially larger metals content, and which therefore has a much greater than normal tendency to promote dehydrogenation, aromatic condensation, gas production or coke formation. Therefore, such higher metals accumulation is normally regarded as quite undesirable in FCC processing.

Presently, the majority of FCC operations utilize a dual fluidized beds of the type described and shown in Modern Petroleum Technology, 4th edition, Hobson & Phol, pgs. 288-309, the disclosure of which is incorporated herein by reference.

The Hettinger, Jr. et al. U.S. Pat. No. 4,406,773, issued Sep. 27, 1983, particularly FIGS. 2 and 3 thereof show typical dual fluidized beds capable of carrying out the process of the invention. Heating of the catalyst, typically about 55 microns in diameter, is necessary to carry out the primary endothermic reactions that form the network of cracking reactions. Oil charge undergoes cracking to form light weight products. Because the bed is fluidized, a perfectly mixed equilibrium population of catalyst exist in the reactor. Undesirable secondary reactions such as olefin polymerization and cracking contribute to coking the catalyst surface. Coking chokes off efficient catalytic activity. At the same time, metals build up on the catalyst is responsible for "aging" and "poisoning" the catalyst. Dehydrogenation and high coke formation typically occurs when the catalyst is poisoned by metals such as nickel, vanadium and iron. Some empirical work suggests that nickel is more than four times as problematical as the vanadium and iron in catalyst poisoning, which is why the formula set forth above has been used extensively in the fluid catalytic cracking art.

Coking and the need for the catalyst to supply the thermal demands of cracking requires the operators to constantly withdraw a catalyst stream and send it to a second fluidized bed in the Regenerator. Combustion air in the Regenerator burns coke off the catalyst, and heats the catalyst so that it comes to the temperature required for optimal cracking operation. Maintaining this heat balance between the reactor and regenerator units is an important consideration in the design of the units. The coking rate of an individual catalyst particle increases as the catalyst ages and acquires metal poisons. Excessive "coking" means that the lay down rate of coking on the catalyst exceeds that needed to reheat the catalyst in the Regenerator. The typical operating procedure at a refinery is to replace a few percent of the catalyst inventory each day with a fresh charge to maintain an equilibrium age and population in the catalyst.

The Hettinger, Jr. et al. patent teaches the use of a magnetized steel mesh to attract zeolite containing catalyst which are poisoned with the metals previously identified. Hettinger, Jr. et al. teach the application of a magnetic field to steel mesh in the reaction zone of a fluidized bed where the more magnetically attracted particles are attached to the steel mesh and are thereby removed from the catalyst leaving those catalyst with a lesser magnetic attraction.

There are a number of problems with the Hettinger, Jr. et al. approach. Principally, the difficulty with the Hettinger, Jr. et al. approach is that it is based on the assumption that the higher parts per million of nickel equivalence on the catalyst, the less effective the catalyst is in providing a large proportion of gasoline in the cracking operation. Moreover, the industry since the Hettinger, Jr., et al. patent has accepted the teaching of the patent that the greater the nickel equivalence in ppm the more poisoned the catalyst and the worse the catalyst is in providing gasoline and other desirable products in the cracking process.

It has been discovered that there is anomaly in the relationship between the concentration of nickel equivalent poisoning and the production of gasoline from cracking operation, wherein some catalyst having a higher degree of nickel poisoning actually produces more gasoline than catalyst with lower concentrations of nickel equivalents.

SUMMARY OF THE INVENTION

Accordingly, it is an object of the invention to provide a new magnetic separation system to beneficiate fluidized cracking catalyst of the zeolite type.

Another object of the invention is to provide a process for beneficiating particulate zeolite catalyst having metal values in excess of 1000 ppm nickel equivalence in a fluidized bed catalytic cracker wherein an open gradient magnetic field is applied circumferentially along a vertical bore creating a magnetic field gradient having its greatest strength at the wall of the bore or cylinder.

Another object of the invention is to separate the catalyst into various divisions having different nickel equivalent ppm ranges and segregating the catalyst having a range of from about 2000 to about 6000 ppm nickel equivalents and recycling that catalyst directly to the fluidized bed cracking operation.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
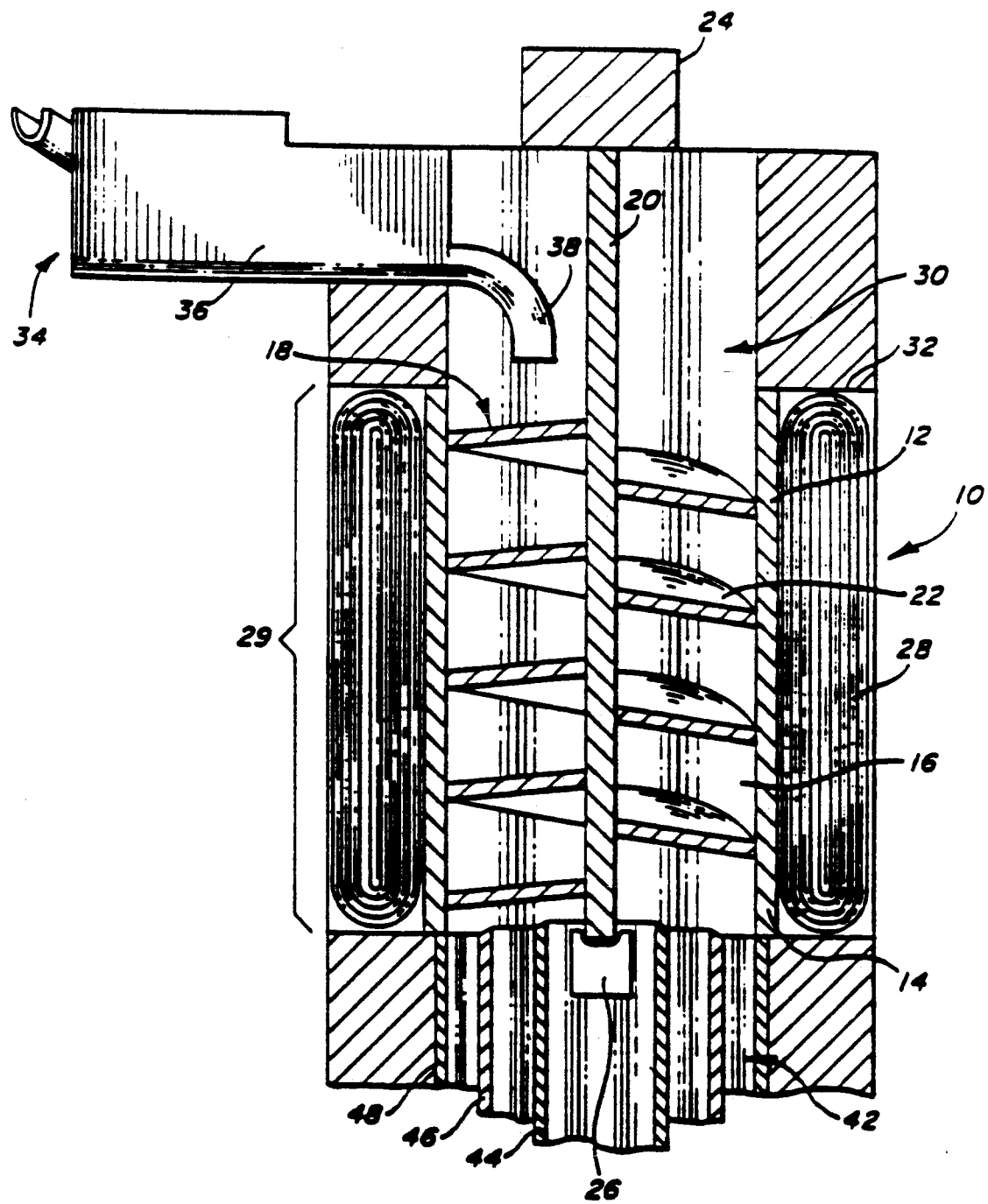
FIG. 1 is an elevational view taken in section of an apparatus for separating particulate zeolite catalyst into segments according to the ppm of nickel equivalence on the catalyst.

FIG. 1 shows an apparatus 10 for separating particulate zeolite catalyst having metal values in excess of about 1000 ppm nickel equivalence used in a fluidized bed catalytic cracker. A vertical cylinder 12 is provided with a wall 14 and a bore 16 extending axially through the cylinder 12. A rotatable vertical screw 18 is axially disposed within the cylinder 12. The screw 18 includes a shaft 20 and a helical blade 22. The helical blade 22 is angled downwardly in both the radial and axial directions, and extends substantially to the wall 14. The screw 18 is connected to a motor 24 which rotates the screw 18 so that the catalyst which may be a zeolite which enters the apparatus at the top of the screw of 18 is carried in a downward direction by the screw 18. A vibration drive 26 is operatively connected to the screw 18 to vibrate the screw 18 during rotation. Vibration may be affected by an air activated device, an electric motor, or other commonly known vibration generating devices. A magnet 28 is disposed around substantially the entire length of the wall 14 of the cylinder 12. The magnet 28 applies a magnetic field in the bore 16.

In the preferred embodiment, the magnet 28 is a superconducting quadrupole magnet which imposes a radial gradient field within the bore 16. The field is strongest at the wall 14 and decreases as it approaches the shaft 20. The magnetic field is axially constant in the central zone 29, and has an axial gradient in a fringe zone 30 which decreases in strength in the upper direction from a top 32 of the magnet 28. The magnet 28 can be in the range of from about 15 cm in length to about 140 cm in length and in one embodiment may have a gradient of 60 Webers per cubic meter at a peak operating current of 1100 Amperes. The superconducting quadrupole magnet 28 may be similar in construction to a superconducting magnet described in an article entitled "A Safe Low Current, High Gradient, Superconducting, Quadrupole Magnet for High Energy Physics Beam Transport", R. P. Smith et al., Applied Superconducting Conf. 1982, Knoxville, Tenn., which is hereby incorporated by reference.

Returning to FIG. 1, quadrupole magnets such as the magnets which may be utilized in the magnet 28 are capable of producing very uniform magnetic field gradients through a relatively large working volume in a cylindrical bore 16. Superconducting magnets, operating at temperatures on the order of 4° K., are able to generate intense magnetic field gradients with very low power consumption. Once energized, the electricity consumption in the magnet is negligible and only the refrigeration power is significant. One estimate for a magnetic separation process puts the energy savings of superconducting magnets over conventional magnets at about 75%. Thus, superconducting magnets in the present application significantly reduce the cost of operation of the apparatus.

In general the magnets useful in the invention provide a magnetic field in the range of about 2 Tesla to about 5 Tesla with gradients in the range of from about 33 Tesla per meter to about 83 Tesla per meter. The vertical extent of the bore 16 depends upon the strength of the magnetic field provided by the magnet 28 since obviously the stronger the magnetic field the shorter the path through which the zeolite catalyst particles should pass in order to ensure that all the particles do not migrate to the wall 14 of the cylinder 12. In order to utilize the apparatus 10, the catalyst is introduced through a conduit 34 which may have an auger 36 shown in the block form in the drawing to a feeder 38. The particulate material is directed to the helical blade 22 by the feeder 38. Rotation of the vertical screw 18 then feeds the particulate matter through the apparatus 10, the entire apparatus previously described being illustrated in U.S. Pat. No. 4,778,594 issued to me Oct. 18, 1988, the disclosure of which is hereby incorporated by reference.

Finally, a splitter 42 is provided beneath the screw 22 which isolates segregated particles falling through the magnetic field generated by the magnet 2 into segments depending upon the amount of attraction or susceptibility the particles have to the magnetic field produced by the magnet 28. In one embodiment, the splitter 42 has three concentric tubes, 44, 46, and 48. The tube 44 isolates the particles which are closest to the shaft 20 which is likely to include those particles having the least amount of nickel equivalents. Tube 46 isolates the particles which are in the center portion of the blade 22 and have a higher magnetic susceptibility than the particles within the tube 44. Finally, the tube 48 isolates the particles which are closest to the wall 14 and magnet 28 and are likely to have the highest magnetic susceptibility of the particles fed through the device 10. Based on the actual experimentations, it is possible to segregate in tube 44 catalyst having a nickel equivalents less than about 2000 ppm and to segregate in tube 46 catalyst having nickel equivalents in the range of from about 2000 ppm to about 6000 ppm and for segregating in the tube 48 catalyst having nickel equivalents of greater than about 6000 ppm. Preferably, the feed material to the system should have less than 10,000 ppm nickel equivalents and a system such as that described in Hettinger, Jr. et al. would be adequate to make a rough cut of the type required to enable the process of the subject invention to be best used.

TABLE 1

Preliminary Tests of Catalytic Activity for Magnetically Separated Petroleum FCC Catalyst Samples
(Adjusted Results to 65% Conversion)

| Component | Low Activity (%) | High Activity (%) | Delta [a] (%) | Change [b] (%) |
|---|---|---|---|---|
| H2-C2 | 2.57 | 2.83 | 0.26 | 9.2 |
| C3 | 4.55 | 3.95 | [0.60] | [15.2] |
| C4 | 7.43 | 6.51 | [0.92] | [14.1] |
| C5-430+ (GASOLINE) | 42.51 | 45.46 | 2.95 | 6.5 |
| 430+ | 35.00 | 35.00 | 0.00 | 0.0 |
| Coke | 6.71 | 5.01 | [1.70] | [33.9] |

[a] - Delta (%) = High Activity (%) - Low Activity (%)
[b] - Change (%) = Delta (%)/High Activity (%)

Table 1 sets forth data which show the effect of the system described on petroleum FCC catalyst sample. Since the material tested had at most 6000 ppm nickel equivalents, the high activity material is the material which was closest to the magnetic wall having the highest susceptibility and the material having nickel equivalence in the range of from about 2000 ppm to about 6000 ppm. The low activity material was the lower susceptibility material and that was cracking catalyst having nickel equivalents in the range of about 2000 ppm and less. As can be seen from Table 1, there was a 2.95% increase in the production of gasoline boiling range components, a significant improvement in this art. Unlike the teaching of Hettinger, Jr. et al., the lowest susceptibility material, that is the material with the least ppm nickel equivalents did not provide the best gasoline production and this was a surprising result. While it is clear that this trend holds for aged catalyst with higher metals loading, we have found that the teaching does not pertain to all metals loadings.

In one aspect, the low susceptible material, that is the material having less than about 2000 ppm nickel equivalents is separated in the device as aforesaid and transported to a reducing reactor designed to accommodate a supply of a reducing gas such as hydrogen, methane, carbon dioxide or other gases well known in the art which can be reacted with the catalyst to reduce the metals dispersed on the zeolite matrix. Where necessary, this reducing reactor will be fitted with a steam jacket to provide indirect heating of the catalyst to improve kinetics of the reducing reaction. From the reducing reactor, the catalyst after reduction will be transported to the make-up catalyst holding vessel which will convey the catalyst back to the FCC system as beneficiated catalyst.

The catalyst separated in the middle of three concentric tubes is that catalyst having a nickel equivalents in the range of from about 2000 ppm to about 6000 ppm and this material can be immediately recycled to the FCC make-up catalyst holding vessel which will convey this portion to the fluidized bed in order to beneficiate the catalyst therein. The high susceptibility portion of the catalyst will be connected to a discharge chamber for holding spent FCC catalyst for later treatment.

In another aspect of the invention the low susceptibility portion, that is the material having nickel equivalents of less than about 2000 ppm can be passivated as is well known in the fluidized bed art. By passivation, it is intended to include all well known systems including reacting with antimony-containing materials. Also included is demetallization using an acid wash to dissolve and remove Ni, V and Fe leaving in fact the catalyst structure, which must be returned to an active state by calcining. After treatment, these catalysts are ready to be recycled to the fluidized bed cracking vessel.

TABLE 2

Open Gradient Magnetic Separation Test Results (Tests on Amoco Casper Refinery Equilibrium Cracking Catalyst Tests Samples 01 and 03). All metals reported in ppm:

|  | Ni | V | Fe | Cu |
|---|---|---|---|---|
| Low Susceptibility Low Activity 051589-01 | 720 | 1,110 | 7,200 | 70 |
| High Susceptibility High Activity 051589-3 | 860 | 1,490 | 7,400 | 60 |

Rendering these numbers in "nickel equivalents" yields the following:

|  | "Nickel Equivalents" (ppm) |
|---|---|
| Low Susceptibility Low Activity 051589-01 | 2,022 |
| High Susceptibility High Activity 051589-03 | 2,261 |

In another example of the invention, the data reported in Table 2 were collected, again showing the difference between the high susceptibility of the material having values in excess of about 2000 ppm nickel equivalence and low susceptibility material right at about 2000 ppm nickel equivalent. The difference between the two although not great in a percentage basis results in an enormous difference in gasoline production, almost 3% which when considered with the amount of petroleum cracking in the U.S. is an astronomical beneficial result, all contrary to the well known teachings of the art.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A process for beneficiating a particulate zeolite petroleum cracking catalyst having metal values in excess of 1000 ppm nickel equivalents, comprising passing said particulate catalyst through a magnetic field in the range of from about 2 Tesla to about 5 Tesla generated by a superconducting quadrupole open-gradient magnetic system for a time sufficient to effect separation of said catalyst into a plurality of zones having different nickel equivalent concentrations, said zones including at least on zone having nickel equivalents of about 6,000 ppm and greater, another zone having nickel equivalents in the range of from about 2000 ppm to about 6000 ppm, at least one zone having nickel equivalents of about 2000 ppm and less, separating said catalysts from said zones, and recycling the catalyst from said another zone to a fluidized bed of zeolite petroleum cracking catalyst for producing a higher percentage of gasoline during petroleum cracking than catalyst having higher or lower nickel equivilants.

2. The process of claim 1, wherein the catalyst is passed through a vertically disposed conduit having said superconducting quadrupole magnetic system disposed therearound to provide a magnetic field strongest at said conduit wall and weakest at said longitudinal central axis of said conduit.

3. The process of claim 2, wherein the magnetic field has a gradient in the range of from about 33 Tesla/meter to about 80 Tesla/meter and said conduit has a length coextensive with said magnetic field in the range of from about 15 cm to about 140 cm.

4. The process of claim 2, wherein the particulate catalyst is dry as it passes through said magnetic field.

5. The process of claim 4, wherein the zone material having nickel equivalents greater than about 6000 ppm is discarded.

6. The process of claim 4, wherein the zone material having nickel equivalent of less than about 2000 ppm is treated by reducing or passivating before being recycled to a petroleum cracking fluidized bed.

7. The process of claim 6, wherein the zone material is treated by exposing same to a gaseous reducing agent.

8. The process of claim 6, wherein the zone material is treated by contacting same with an antimony-containing passivating medium.

9. The process of claim 6, wherein the zone material is treated by contacting same with an acid-containing wash which is non-reactive to said zeolite catalyst structure.

10. The process of claim 1, wherein the magnetic field is disposed vertically and horizontally of the conduit, said vertical extent of said magnetic field being in said range of from about 15 cm to about 140 cm.

* * * * *

UNITED STATES PATENT AND TRADEMARK OFFICE
CERTIFICATE OF CORRECTION

PATENT NO. : 5,250,482
DATED : October 5, 1993
INVENTOR(S) : Richard D. Doctor

It is certified that error appears in the above-indentified patent and that said Letters Patent is hereby corrected as shown below:

On the title page, item [54] and col. 1, line 1,

"FRO" should --FOR--.

Col. 8, claim 1, line 10, "on" shoudl read --one--

Signed and Sealed this

Third Day of May, 1994

*Attest:*

BRUCE LEHMAN

*Attesting Officer*    *Commissioner of Patents and Trademarks*